May 13, 1941. E. J. H. JONES 2,242,076
ELECTRIC CONTROL SYSTEM
Filed March 31, 1938    10 Sheets-Sheet 2

INVENTOR
ERNEST JAMES HENRY JONES
ATTORNEYS

May 13, 1941.　　　E. J. H. JONES　　　2,242,076
ELECTRIC CONTROL SYSTEM
Filed March 31, 1938　　　10 Sheets-Sheet 4

Fig.4.

INVENTOR
ERNEST JAMES HENRY JONES
By Stebbins, Blenko & Parmelee
ATTORNEYS

Fig. 6.

INVENTOR
ERNEST JAMES HENRY JONES
ATTORNEYS

May 13, 1941.  E. J. H. JONES  2,242,076
ELECTRIC CONTROL SYSTEM
Filed March 31, 1938   10 Sheets-Sheet 7

INVENTOR
ERNEST JAMES HENRY JONES
ATTORNEYS

May 13, 1941.　　　　E. J. H. JONES　　　　2,242,076
ELECTRIC CONTROL SYSTEM
Filed March 31, 1938　　　10 Sheets-Sheet 9

Fig.9.

INVENTOR
ERNEST JAMES HENRY JONES
BY Stebbins Blenhart Parmelee
ATTORNEYS

Fig. 10.

UNITED STATES PATENT OFFICE 2,242,076

ELECTRIC CONTROL SYSTEM

Ernest James Henry Jones, Wembley, England, assignor to The Associated Equipment Company Limited, Southall, Middlesex, England, a company of Great Britain Application March 31, 1938, Serial No. 199,161
In Great Britain April 14, 1937

8 Claims. (Cl. 77—32)

This invention is for improvements in or relating to electric control systems and has for an object to enable a succession of operations to be controlled automatically in a simple manner or in such a way that changes in the timing or succession of the operations can readily be made.

The invention provides a method of controlling a succession of operations in a machine or apparatus, comprising employing a photo-electric cell to control electrically the performance of the said succession of operations, and alternately exposing the cell to light and excluding light from the cell in a predetermined sequence with the periods of exposure and exclusion of light corresponding to those during which operations in the succession are required to take place. For controlling a succession of movements between two relatively movable members the energization and de-energization of the photo-electric cell may be caused to take place in accordance with changes in the relative settings of said members. The method of control in accordance with the invention makes for simplicity since the timing of the operations may be governed by a single movable element in the form of a shutter associated with the photo-electric cell. It is to be understood that the term "photo-electric cell" is used herein to include any form of cell that can be used to vary the flow of electric current in a control circuit in accordance with variations in the admission of light to the cell.

The invention further provides, in a machine or apparatus wherein a predetermined succession of operations is required to be performed, the combination with an electrically-operated device by which the operation of the part or parts required to perform the said succession of operations is controlled, of a photo-electric cell connected in a control-circuit of said electrically-operated device and a shutter between which and the photo-electric cell relative movement takes place to control the admission of light to the cell in accordance with the required succession of operations, which shutter has light-transmitting and light-excluding portions of appropriate extents to energize and de-energize the cell for periods corresponding to those during which operations in the succession are required to take place. By this provision a complicated succession of operations can be controlled quite simply, and when a change in the timing or the succession of the operations is required to be made it is only necessary to replace the existing shutter by a modified shutter arranged to operate in accordance with the required modified timing or succession of the operations.

In a construction wherein the movements of a plurality of different parts are required to be correlated or the movements of a single movable member in a plurality of different directions at different stages of its operation are required to be controlled, there may be provided a plurality of photo-electric cells respectively controlling the movements of said parts or the movements in said different directions of the single movable member, and a shutter which is common to said photo-electric cells and is arranged to vary the admission of light to them in a predetermined manner.

When a shutter as aforesaid is arranged to control the movements of a movable member, such as a tool or workpiece of a machine tool, it is preferred to have the shutter driven so as to move in proportion to movements of said movable member. A possible alternative procedure is to drive the shutter from a time-controlled driving device operating independently of the driving-means by which the movable member is operated.

The invention further comprises a construction wherein a variable feed-movement of a movable member is arranged to be controlled by a photo-electric cell and a shutter associated therewith, and wherein an additional change in the movement of the movable member is required to be superimposed at a predetermined stage on its variable feed-movement, and wherein said shutter has associated with it an auxiliary shutter arranged to modify the energization of the photo-electric cell during the said additional change in the movement of the movable member.

The invention also includes, in a machine or apparatus wherein a predetermined succession of movements of a movable member is required, including a variable feed-movement having superimposed thereon at a predetermined stage a reverse movement followed by a return of the member approximately to the position occupied by it immediately before the reversal, the combination with an electrically-operated device by which the movements of the movable member are controlled, of movable main and auxiliary electric-circuit control-elements arranged during their movement to vary the energization of said electrically-operated device in a predetermined manner, with the main control-element arranged to control the feed-movement of the movable member and to energize said electrically-operated device for reverse movement of the movable member, and with the auxiliary control-element arranged to be oscillated during the said reverse and return movements of the movable member with movements proportional to said reverse and return movements and when so oscillated to modify the control secured by means of the main control-element. The said control-elements may take various forms. They are preferably shutters controlling the admission of light to a photo-electric cell or cells, but it is also within the invention to employ other electric circuit-controllers, for instance electric contact-making devices employing drums or discs carrying suitably spaced electric contacts.

The foregoing and other provisions in accordance with the invention are embodied in a preferred construction which is illustrated in the accompanying drawings and which will now be described by way of example only and with reference to the drawings.

In the drawings.

Like reference characters indicate like parts throughout the drawings.

The drilling machines shown in the drawings are particularly intended for drilling aligned journals of crank-shafts for internal-combustion engines, but they are of course suitable for performing reaming operations or for other purposes where a rotating tool is required to perform a predetermined succession of operations. Two machines are shown side by side on a common mounting but each machine is separately driven by electric motors and has its own control mechanism. For the purposes of the present application it will, therefore, only be necessary to describe the driving and control mechanism of one machine.

The bed on which the machines are mounted is shown at 11 and it supports a box-like casing 12 common to the two machines. The casing 12 carries upstanding pillars 13, one for each machine, and each pillar 13 affords guideways 14 on which the drill-head shown at 15 is vertically slidable towards and away from the work. Each drill-head 15 is travelled up and down the guideways by a lead-screw 16 supported at its ends in bearing casings 17 and 18 secured respectively to the top of the pillar 13 and the box-like casing 12. Each drill-head 15 is counterbalanced by a weight 19, see Figure 2, disposed within the pillar 13 and coupled to the drill-head by ropes, chains or the like 20 passing over pulleys 21 and 22 at the top of the pillar. Each drill-head carries an electric motor 23 for rotating the drill-spindle. The lead-screw for traversing the drill-head is driven from two electric motors 24 and 25, see particularly Figure 7, contained within the pillar 13.

Figure 1:
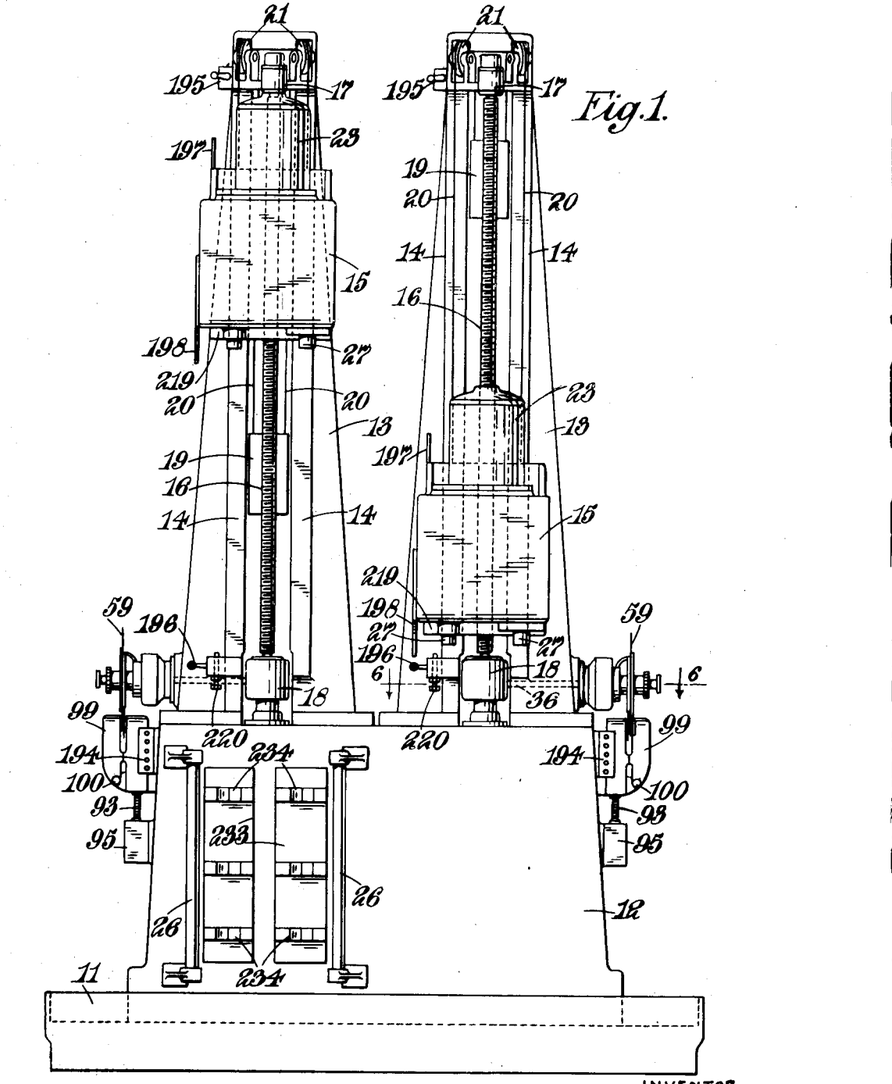
Figure 1 is a view in front elevation showing two vertical automatic drilling machines controlled in accordance with the invention.

The work to be drilled is supported in front of the casing 12 by any convenient means. In Figure 1 the left-hand machine is shown as provided with supporting plates 233 secured to the front of the casing 12 and each formed with V-blocks 234 to embrace the journals of a crank-shaft to be drilled, the blocks 234 being adapted to be covered by clamping plates (not shown) for holding the crank-shaft in place. Bars 26 also secured to the casing 12 are shown to receive adjustable swinging arms which may carry drilling templates for interposition between the journals of a crank-shaft. In the construction shown each drill-head 15 has two drill-spindles 27. These may be used as alternatives, or if two precisely similar drilling operations are to be performed with each drill-head, the spindles 27 may be used simultaneously. Obviously instead of there being two drill-spindles 27 per drill-head, there may be only one.

The electric motors 24 and 25 are coupled to the lead-screw 16 through differential mechanism to be described later contained in a box-like casing 28 mounted on the top of the casing 12 within the hollow pillar 13. The output shaft of the differential mechanism is shown at 29, see particularly Figure 6, and it is coupled by a muff coupling 30 to a short shaft 31 reaching within the casing 18 and having fixed to its end a bevel gear 32 meshing with a bevel gear 33 also within the casing 18 and fixed to the lower end of the lead-screw 16. The shaft 29 has secured to it a bevel gear 34 meshing with a bevel gear 35 secured to a shaft 36. The latter is mounted in a bearing 37 carried by a cover-plate 38 of the casing 28, which cover-plate is also formed with a bearing 39 for the shaft 29. The shaft 36 extends through one side of the pillar 13 and serves to drive control mechanism for controlling the traverse movement of the drill-head. It will be seen that the shaft 36 is driven from the motors 24 and 25 so as to rotate at a speed which is proportional to the speed of rotation of the lead-screw 16.

Figure 3:
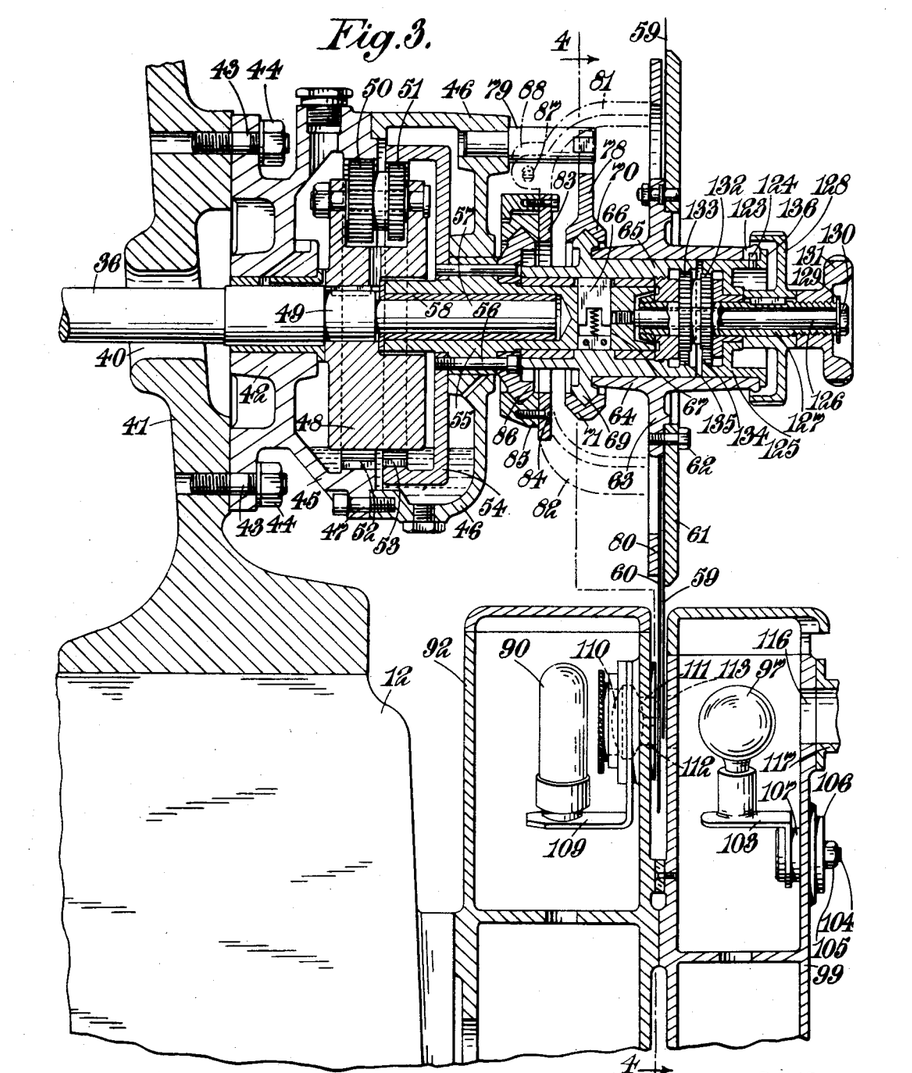
Figure 3 is a detail view in cross-section, taken on the line 3—3 of Figure 2, showing the control mechanism on a scale larger than that of Figures 1 and 2.
Figure 4:
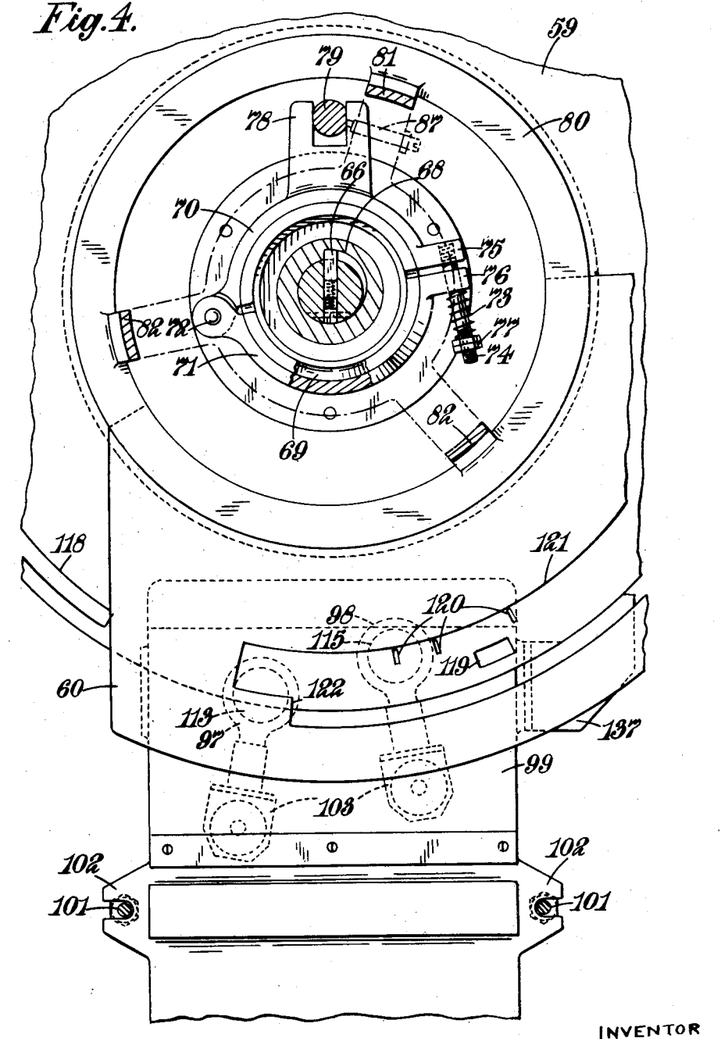
Figure 4 is a cross-sectional view, taken on the line 4—4 of Figure 3.

Referring now to Figures 3 and 4, the shaft 36 extends through an opening 40 in the lower part of the side wall 41 of the pillar 13. The shaft is supported in a bearing 42 clamped by studs 43 and nuts 44 to the outer face of the wall 41. The bearing 42 has an annular extension 45 forming the cover of an oil casing 46 to which it is clamped by bolts 47. Within the casing 46 there is a wheel 48 keyed to a reduced portion 49 of the shaft 36 and rotatably supporting gear wheels 50 and 51 of an epicyclic train. The gears 50 and 51 rotate together and mesh respectively with a ring gear 52 formed internally on the member 45 and a ring gear 53 formed internally on a rotatable member 54 secured to a shaft 55 by bolts 56. The shaft 55 has a hollow end to receive the reduced end 57 of the shaft 36 and a bearing sleeve 58. The gear wheel 51 has fewer teeth than the gear 50, so that as the shaft 36 and wheel 48 are rotated the shaft 55 is driven at a considerably reduced speed.

The shaft 55 serves to drive two control members constituted by a disc 59 and a quadrant 60 arranged to control the operation of the lead-screw 16 in a manner described later. The disc 59 is secured to a circular plate 61 which in turn is clamped by bolts 62 to a flange 63 on a sleeve 64. The latter is mounted on a sleeve 65 mounted on the right-hand end of the shaft 55. The sleeve 65 is coupled to the shaft 55 by a one-way driving connection comprising a spring-pressed plunger 66 movable radially in a pocket 67 in the shaft 55 and co-operating with a single recess 68 of the shape of a ratchet tooth formed internally in the sleeve 65, see particularly Figure 4. Due to this arrangement of parts the disc 59 is rotated by the shaft 55 only when the lead-screw 16 is rotated in the direction to carry the drill-head towards the work. During reverse rotation of the lead-screw 16 and the shaft 55 the disc 59 is held stationary by a brake comprising a brake-member 69 formed externally on the sleeve 65 and brake-shoes 70 and 71 pivoted together at 72 and encircling the member 69. The shoes 70 and 71 are yieldably urged together by a spring 73 carried on a rod 74 which extends from a lug 75 on the member 70 to a lug 76 on the member 71, the spring 73 being held between nuts 77 and the lug 76. The shoes 70 and 71 are held against rotation by a forked lug 78 on the member 70 engaging with a post 79 mounted on the fixed casing 46. When the disc 59 is rotated during feed movement of the drill-head slippage takes place in the brake 69, 70, 71.

The quadrant 60 is secured to a ring 80 which is supported by curved arms 81 and 82 extending from a ring 83. The latter is secured as by screws 84 to the outer part 85 of a slipping clutch 85, 86, the inner part 86 of which is secured to the shaft 55 by the bolts 56. The quadrant may be driven in either direction through the clutch 85, 86 from the shaft 55 except when an obstacle is encountered as occurs when a stop member 87 mounted in a lug 88 of the arm 81 bears against the post 79 to limit forward movement of the quadrant.

Figure 5:
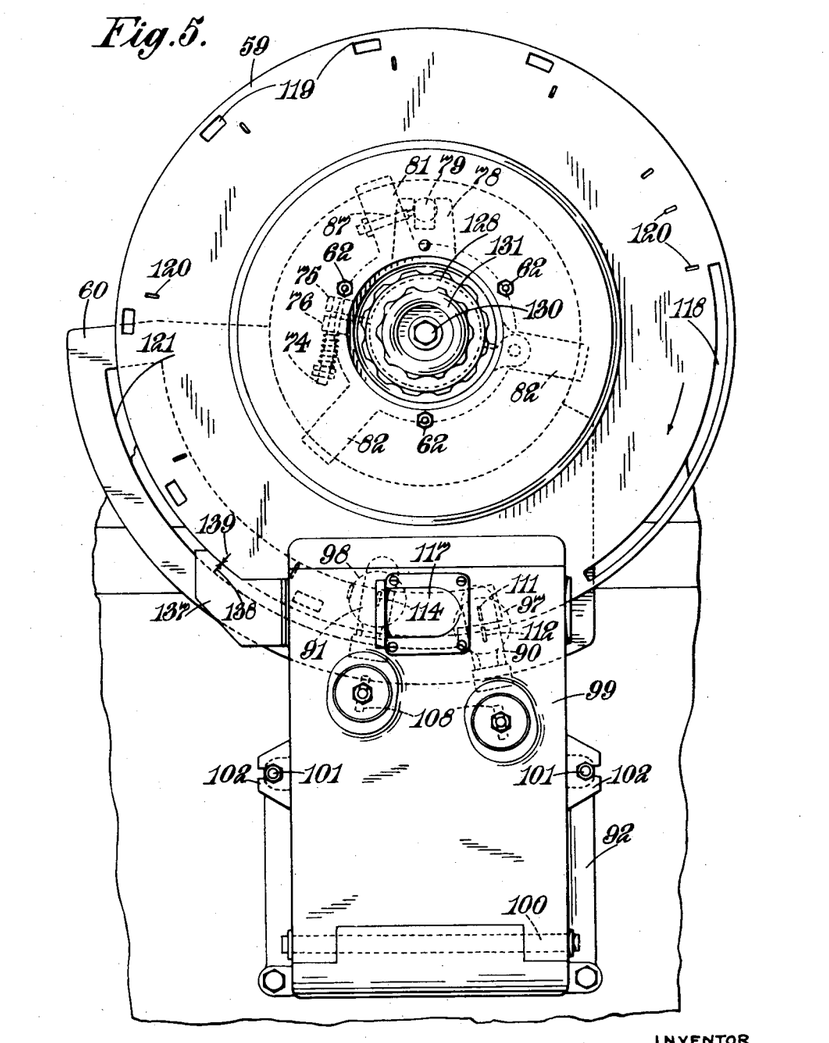
Figure 5 is an end view of the parts as seen from the right of Figure 3 and is drawn to a scale somewhat smaller than that of Figure 3.

In the construction shown in the drawings the control elements constituted by the disc 59 and quadrant 60 take the form of shutters controlling photo-electric cells indicated at 90 and 91, see Figures 3 and 5. The cells 90 and 91 are referred to respectively as the "forward" and "reverse" cells because they are employed respectively for bringing about forward and reverse movements of the drill-head 15. The cells 90 and 91 are disposed side by side in separate comparts of a common casing 92 mounted on one side of the casing 12. Electrical connections 93 and 94 extend from the lower part of the casing 92 to switch boxes 95 and 96 (see Figure 2) also mounted on the casing 12 and containing respectively switches operated by energization of the cells 90 and 91. Light for energizing the cells is supplied by electric lamps 97 and 98 mounted within a separate casing 99 which is pivoted at 100 to the casing 92 and held in operative position by bolts 101 co-operating with lugs 102 on the casing 99. Each lamp 97, 98 is carried on an adjustable bracket 103 secured in place by a bolt 104, nut 105 and clamping washers 106 and 107, the bolt 104 passing through a slot 108 in the casing 99, see Figure 5. Each photo-electric cell 90, 91 is mounted on a bracket 109, the latter being supported around a lens system 110 serving to project light from the appropriate lamp 97 or 98 on to the cell. The forward cell 90 is disposed alongside two windows 111 and 112 formed in the casing 92 and constituted by narrow slots arranged in line. A circular opening 113 is formed in the casing 99 between the lamp 97 and the cell 90 and registers with the slots 111 and 112. The reverse cell 91 is disposed alongside a single window in the form of a narrow slot 114, and light from the lamp 98 is arranged to pass through a circular aperture 115 in the casing 99, said aperture registering with the slot 114. An inspection opening 116 is formed in the casing 99 and is fitted with a viewing device 117.

It will be seen from Figure 5 that the disc 59 is formed with two circumferential rows of slots. The outer row comprises a long slot 118 and six shorter slots 119. The slots 118 and 119 co-operate with the window 111 of the fast forward cell 90 so as to permit passage of light from the lamp 97 through the window 111 to the cell. The inner row of slots in the disc 59 comprises a series of short slots 120 and these co-operate with the window 114 of the reverse cell 91 so as to permit light from the lamp 98 to illuminate the cell 91 through the window 114. The quadrant 60 is formed with a single slot 121 of sufficient width to expose all of the windows 111, 112 and 114, and the boundary of the slot is stepped at 122 to afford an opaque portion for cutting off light from the window 112.

Figure 2:
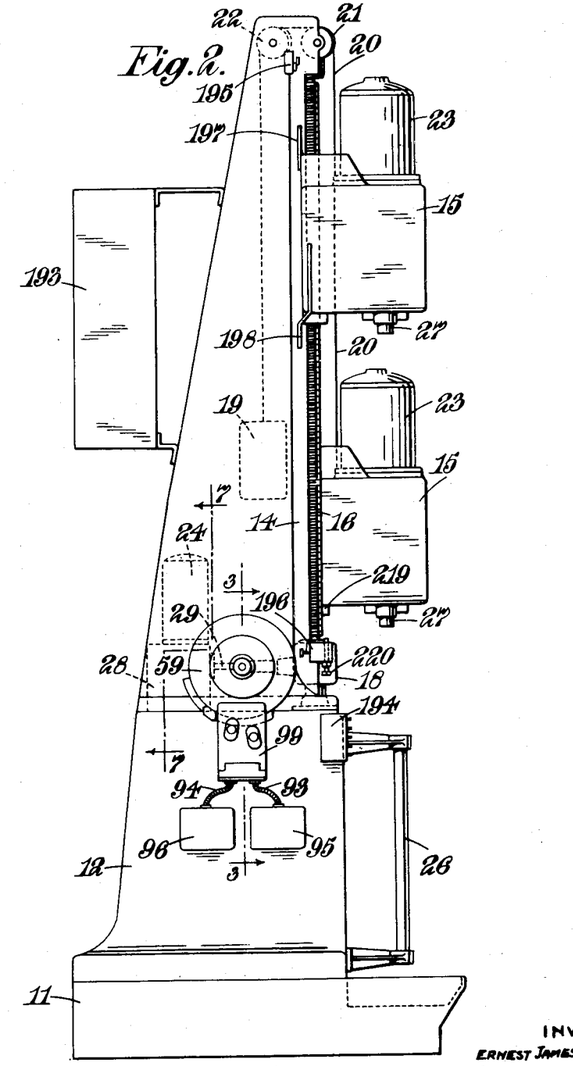
Figure 2 is a view of the same machines in side elevation as seen from the left of Figure 1.

The epicyclic reduction gearing 50, 51, 52 and 53 is so arranged as to drive the disc 59 exactly through one complete rotation during a complete feed stroke of the drill-head. It is desirable so to mount the disc 59 as to permit it to be adjustable angularly about the axis of the sleeve 65. To this end the sleeve 64 is not keyed to the sleeve 65 but is slotted at one end as at 123 to engage with one or more pins 124 on a bearing sleeve 125 mounted within the sleeve 64. Within the sleeve 125 there is a rod 126 screwed to the right-hand end of the shaft 55. Between the rod 126 and the sleeve 125 there is rotatably mounted an adjusting sleeve 127 keyed to an adjusting knob 128. The sleeve 127 is held against endwise movement by a washer 129 secured to the rod 126 by a screw 130, and between the washer 129 and the knob 128 the sleeve 127 has screwed to it a locking knob 131. The adjusting sleeve 127 carries eccentrically a bearing on which are rotatably mounted two gears 132 and 133 which are fast to one another so as to rotate together. These gears respectively mesh with internal gears 134 and 135 formed respectively on the bearing sleeve 125 and an extension of the sleeve 65. When the locking knob 131 is unscrewed to move it to the right as viewed in Figure 3 the relative settings of the disc 59 and the sleeve 65 can be varied to give accurate adjustment of the disc by turning the knob 128. This has the effect of rotating the sleeve 127 and carrying the gears 132 and 133 bodily round the internal gears 134 and 135. The gear 132 is made to have fewer teeth than the gear 133 so that the bodily displacement of the gears has the effect of causing angular movement between the sleeve 65 and the bearing sleeve 125. When the disc 59 has been adjusted as required the locking knob 131 is turned to move it to the left as shown in Figure 3 and this has the effect of moving the knob 128 and the bearing sleeve 125 and sleeve 64 along the sleeve 65 until the parts become locked by engagement of the sleeve 64 with the brake-member 69, it being noted that the sleeve 125 has an end flange 136 to engage the right-hand end of the sleeve 64 when the parts are locked. As shown in Figures 2, 4 and 5, an indicator plate 137 is secured to one side of the casing 99 and carries an indication 138, against which an indication 139 on the disc may be aligned.

Figure 7:
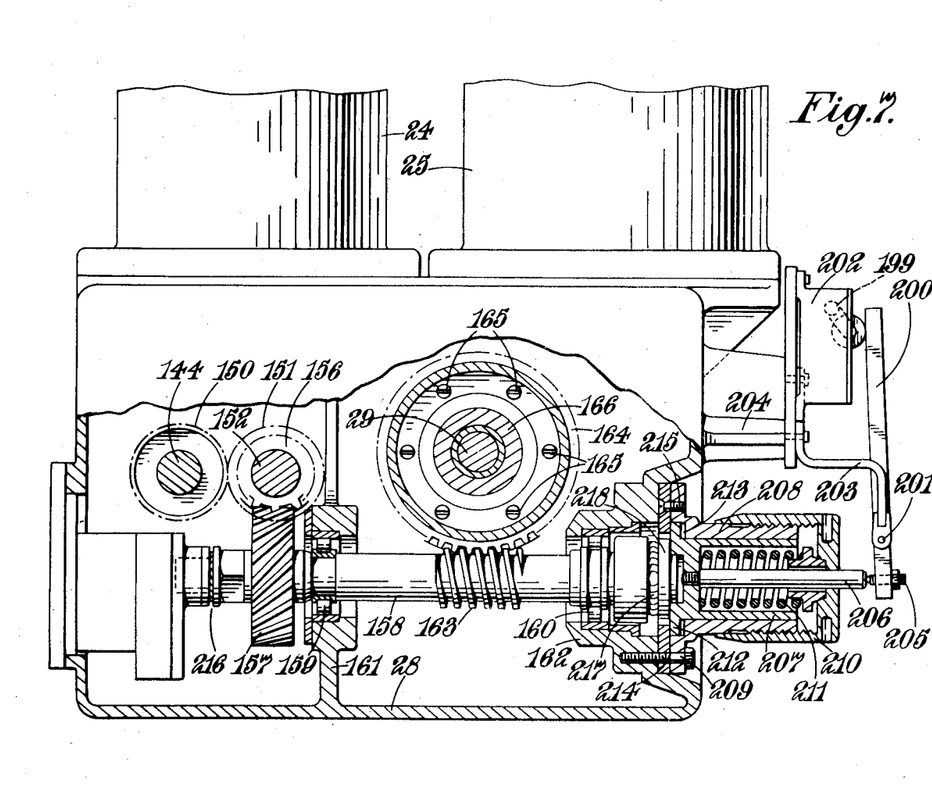
Figure 7 is a view taken on the line 7—7 of Figure 2, but on a scale larger than that of Figure 2, showing parts contained within the column of each machine, the position of the cross-section at the bottom of Figure 7 being also indicated by the line 7—7 in Figure 6.
Figure 8:
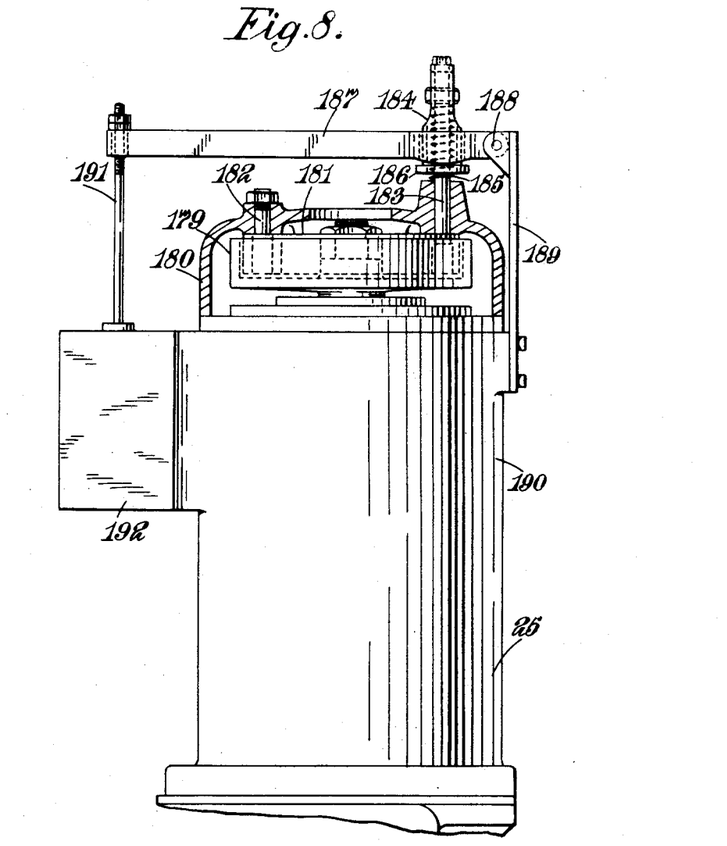
Figure 8 is a view of an electric motor fitted with an automatic brake.

As already indicated, the lead-screw 16 is driven through differential mechanism by two electric motors 24 and 25 shown in Figures 7 and 8. In feeding the drill-head to the work two different movements are required at different times, viz. a slow feed-movement when the drill is cutting and a fast feed-movement when the drill is not cutting but is being moved up to the work. Further, it is necessary to reverse the feed of the drill at intervals for the removal of swarf and the reverse movement should be a high-speed movement. The motor 24 in the present embodiment is employed for effecting the slow forward (cutting) feed and the motor 25 for the high-speed forward and reverse movements of the drill-head. The slow feed motor 24 is operated continuously while the machine is working and the fast-speed reversible motor 25 is brought into and out of operation and reversed as required under the control of the electric-circuit control-elements constituted by the disc 59 and quadrant 60 aforesaid. The differential drive from the motors 24 and 25 will now be described.

Figure 6:
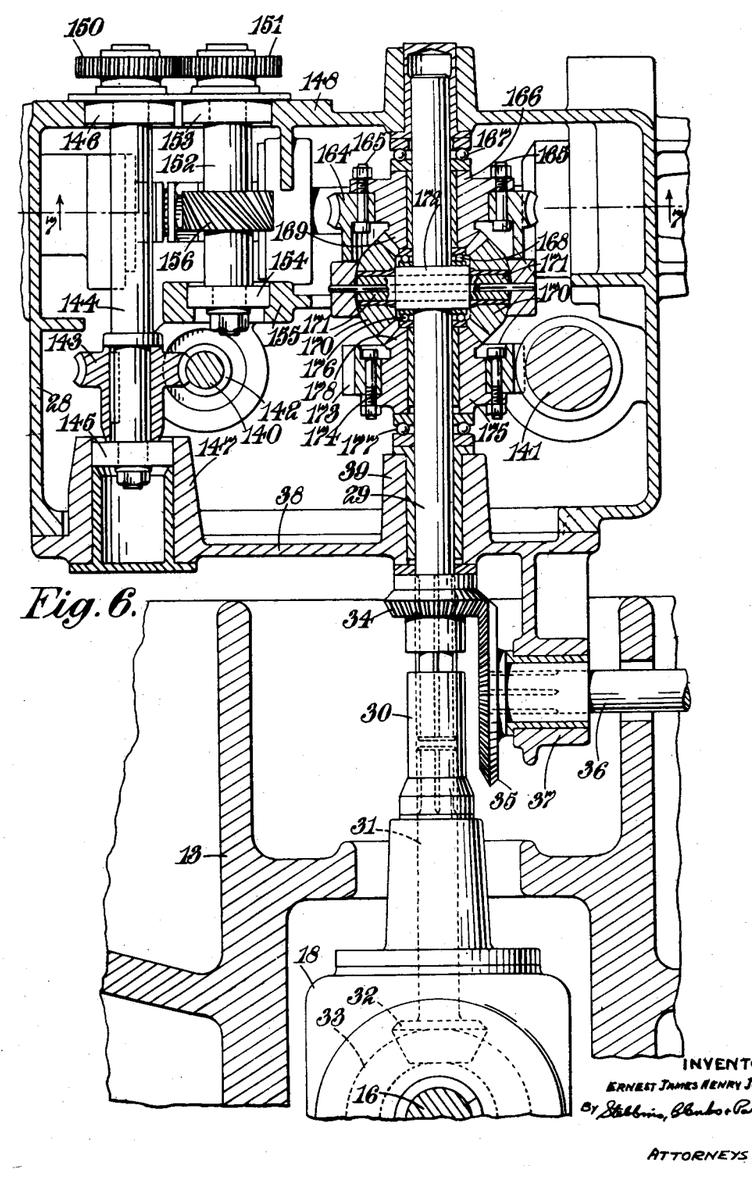
Figure 6 is a plan view in cross-section, taken on the line 6—6 of Figure 1, on a scale larger than that of Figure 1.

Referring to Figure 6, the spindle of the slow-speed motor 24 is shown at 140, and 141 represents a skew gear on the spindle of the fast-speed motor 25. The spindle 140 is formed with or carries a worm 142 meshing with a worm wheel 143 secured to a cross-shaft 144 which rotates in bearings 145 and 146 supported respectively in a boss 147 on the cover-plate 38 and by the end wall 148 of the casing 28. On one end of the shaft 144 is a gear 150 meshing with a gear 151 on a short parallel shaft 152 which rotates in bearings 153 and 154, the latter being supported by a bearing bracket 155. Between its bearings the shaft 152 carries a skew gear 156, see also Figure 7, and the gear 156 meshes with a skew gear 157 on a worm shaft 158. The latter is mounted to rotate in anti-friction bearings 159 and 160 carried respectively in a bearing bracket 161 and a boss 162, both formed integrally with the casing 28. The shaft 158 carries a worm 163 meshing with a worm wheel 164 secured by bolts and nuts 165 to a short sleeve 166 which is freely mounted on the shaft 29 between end thrust bearings 167 and 168. The sleeve 166 is formed integrally with a bevel gear 169 meshing with planetary bevel gears 170 rotatably mounted on stub shafts 171 extending radially from a collar 172 secured to the shaft 29.

The skew gear 141 meshes with a skew gear 173 secured by bolts and nuts 174 to a further sleeve 175 similar to the sleeve 166. The sleeve 175 is also freely mounted on the shaft 29 between thrust bearings 176 and 177, and it is also formed integrally with a bevel gear 178 meshing with the planetary bevels 170 on the opposite side of the collar 172 to that on which the bevel gear 169 is disposed. The fast-speed motor 25 which drives the skew gear 141 is shown in Figure 8 as viewed from the right of Figure 7 and in the upper part 180 of the motor casing there is disposed a brake drum 179 secured to the motor spindle. The drum 179 contains brake-shoes 181 pivoted at 182 to the casing 180 and adapted to be splayed apart by the cam spindle 183. The latter is operated in known manner by a sleeve 184 slidable endwise on the spindle 183 against the action of a spring 185. The sleeve 184 carries a flange 186 which is engaged by a bifurcated arm 187 pivoted at 188 to a bracket 189 secured to the main body 190 of the motor casing. The free end of the arm 187 is coupled by a link 191 to an electrical solenoid contained within a casing 192 secured to the main body 190 of the motor casing. The parts are so arranged that the brake 179, 181 is brought into action to arrest the spindle of the motor 25 under the action of the spring 185 whenever the motor is de-energized. When the motor is energized the solenoid in the casing 192 is also energized so as to release the brake.

It will be seen from the foregoing that when the fast-speed motor 25 is at rest, its brake serves to hold the bevel gear 178 against rotation. Assuming the slow feed motor 24 is in operation, the bevel gear 169 drives the planetary bevels 170 so as to rotate the shaft 29 and therefore the lead-screw 16 and control shaft 26 at slow speed. If the fast-speed motor 25 is now brought into operation, the bevel gear 178 is caused to rotate and drive the planetary bevels 170 so as to rotate the shaft 29 at fast speed. In one direction of rotation of the spindle of the motor 25 its drive is added to the drive from the slow feed motor 24, and in the other direction of rotation of the fast-speed motor spindle the drive from the latter is subtracted from the drive from the slow feed motor and overrides the effect of the latter so as to rotate the shaft 29 in the reverse direction at high speed.

The electrical switch gear by which the motors 23, 24 and 25 are operated is contained in a switch box 193 secured to the rear of the pillar 13, see Figure 2. Associated with said switch gear are the switches in the boxes 95 and 96, push buttons in a push button box 194 secured to a side wall of the casing 12, and other switches to which reference will now be made. For limiting movements of the drill-head 15 limit switches 195 and 196 are provided to one side of the guideways 14 at the upper and lower ends of the pillar 13. The limit switches co-operate respectively with projections 197 and 198 secured to the drill-head 15. These limit switches are provided to prevent the drill-head from overrunning its normal limits of travel. A further safety device is illustrated in Figure 7 and consists of a worm overload release switch 199 which is provided to safeguard the motors, gearing and the drills themselves against overload due to excessive resistance to the drill, which resistance may be caused by accumulation of swarf or in other ways. The switch 199 is contained in a casing 202 and is operated by an arm 200 pivoted at 201 to a bracket 203 secured to a support 204 which also carries the casing 202 and is formed integrally with or secured to the casing 28.

The arm 200 is operated through an adjusting screw 205 by means of a plunger rod 206 secured to a plunger 207. The latter is mounted for limited sliding movement in a sleeve 208 secured by bolts 209 to the boss 162 and has a screw-on cap 210 between which and the plunger 207 there is interposed a strong compression spring 211 normally holding the plunger against endwise movement. The plunger 207 is formed with an external flange 212 which engages in an annular recess 213 in the sleeve 208 and serves to limit the movements of the plunger 207 by engaging the end wall of said recess on the one hand and a washer 214 on the other hand, the washer being interposed between the sleeve 208 and the boss 162 and secured to the sleeve by screws 215. The shaft 158 is provided with end-thrust bearings 216 and 217 and the outer race 218 of the latter bears against the end face of the plunger 207. The worm shaft 158 is driven so as to be rotated in a direction such that the resistance to rotation of the worm wheel 164 tends to cause the worm shaft 158 to be moved to the right as viewed in Figure 7 so that the bearing race 218 is held against the end face of the plunger 207. The strength of the spring 211 is, however, so chosen that no endwise movement of the plunger 207 can take place except in the event of an excessive resistance being encountered by the drill or drill-head. Under such circumstances the shaft 158 will be moved to the right as viewed in Figure 7 (such movement being permitted by the bearings 159 and 160 which are roller bearings permitting endwise movement between the rollers and the outer races) and the plunger 207 will be moved against the action of its spring 211 so that the arm 200 will be rocked by the plunger rod 206 and the switch 199 operated. To provide a similar overload release precluding downward movement of the drill-head 15 beyond its several limits of travel, the drill-head 15 is provided with an abutment 219, see Figure 2, to co-operate with an adjustable stop screw 220 fixed to the casing of the limit switch 196. On engagement of the abutment 219 with the stop screw 220 the worm overload release just described is brought into operation so as to actuate the switch 199.

Figure 10:
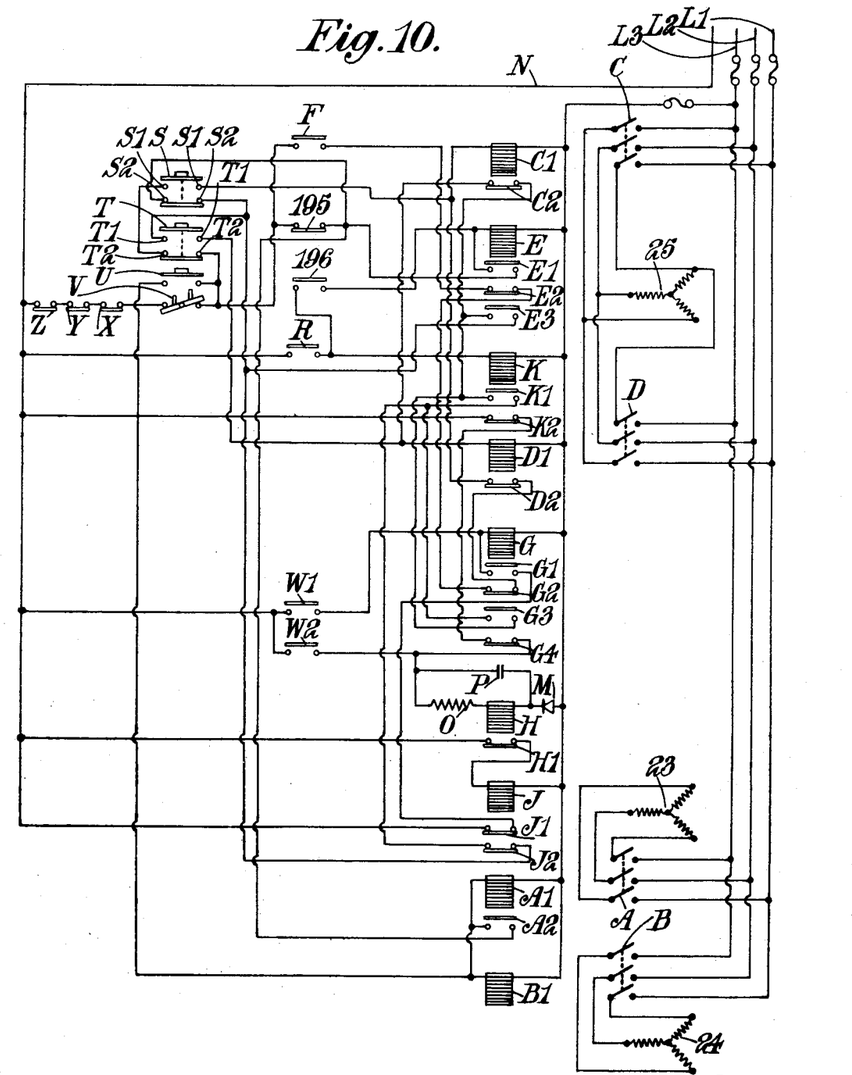
Figure 10 is a diagram showing one suitable arrangement of electrical connections.

The electrical circuits by which the control of the motors 23, 24 and 25 is secured can take various forms and they do not form part of the present invention. One suitable system of control is, however, illustrated diagrammatically in Figure 10 to assist a full understanding of the operation of the present construction. In Figure 10 the motors 23, 24 and 25 are indicated diagrammatically as three-phase alternating current motors to be energised from a three-phase four-wire supply comprising lines $L^1$, $L^2$ and $L^3$ and a neutral line N. The motors are energized and de-energized by triple-pole contactors indicated at A, B, C and D, the contactors C and D being provided respectively for energizing the fast-speed motor in the forward and reverse directions. The energizing coils of the contactors are shown at $A^1$, $B^1$, $C^1$ and $D^1$, and auxiliary switches operated by the contactors A, C and D are indicated at $A^2$, $C^2$ and $D^2$. In addition there are provided relays having coils E, K, G, H and J. The relay coil E operates switches $E^1$, $E^2$ and $E^3$. The relay coil K operates switches $K^1$ and $K^2$. The relay coil G operates switches $G^1$, $G^2$, $G^3$ and $G^4$. The relay coil H operates switch $H^1$, and the relay coil J operates switches $J^1$ and $J^2$. The coil H is designed for continuous current operation and is connected in series with a rectifier M and a resistance O. Across the resistance O and coil H there is connected a condenser P. For the manual control of the motors there are shown four push-buttons S, T, U, V provided respectively for starting the fast-speed motor forwards, starting the fast-speed motor in reverse, starting both motors 23 and 24, and stopping all three motors 23, 24 and 25. There are also shown in Figure 10 normally open switches F and R which are respectively operated by the fast forward and reverse photo-electric cells 90 and 91. The upper limit switch 195 and the lower limit switch 196 are further included in the diagram as are also two normally open switches $W^1$ and $W^2$ constituting the worm overload switch 199. Overload switches associated respectively with the three motors are shown at X, Y and Z. All of the control circuits are connected between the neutral line N and the line $L^3$.

Figure 9:
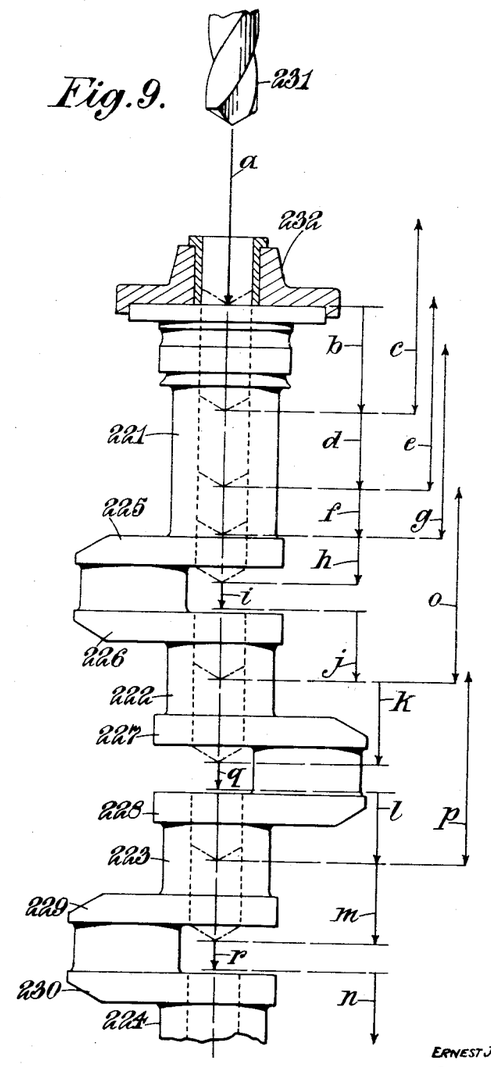
Figure 9 is a diagrammatic view illustrating the drilling of the journals of a crank-shaft.

The operation of the automatic drilling machine described above will now be explained. Figure 9 illustrates somewhat diagrammatically the movements required to be performed by the drill-head for drilling aligned holes through the main journals of a crankshaft. The latter comprises a long main journal 221 and shorter main journals 222, 223 and 224 separated by spaces between crank arms 225 and 226, 227 and 228, and 229 and 230. The end of the drill is shown at 231 and it is required to have a succession of movements as follows. First of all a fast forward movement indicated by the long arrow $a$ is required to bring the point of the drill close to the work. Secondly, a slow forward (cutting) feed indicated by the arrow $b$ is needed, and this is followed by a reverse and return movement indicated by the double arrow $c$ performed at high speed, the object of the reverse movement being to clear the drill of swarf. Further slow feed-movements followed by reverse and return movements as indicated at $d, e, f, g$ and $h$ are required until the drill is passed through the long journal 221, and then a fast forward movement indicated by the arrow $i$ is needed to move the drill through the space between the journals 221 and 222. The movements of the drill are continued in similar manner to pass it through the journals 222, 223 and 224 and to move it at fast speed through the spaces between these journals. Thus it will be appreciated that slow feed-movements indicated at $j, k, l, m$ and $n$ are needed as well as intermediate fast reverse and return movements indicated at $o$ and $p$ and fast forward movements indicated at $q$ and $r$.

Assuming the drill-head 15 is at the top of its travel and the crank-shaft is in position on the work-support in line with the drill-spindle, the operator first depresses the fast forward push button S and by so doing establishes a circuit through the coil $C^1$, through the normally-open contacts $S^1$, interlocking contacts $T^2$ of the button T, the stop button V and the overload switches X, Y and Z. The switch C is thereby closed and the fast-speed motor 25 is driven in a forward direction and thus rotates the shaft 29 through the differential mechanism 178, 170, 172, the bevel gear 169 being held against rotation by engagement between the worm 163 and worm wheel 164. The lead-screw 16 is rotated to carry the drill-head 15 downwardly towards the work, thus closing the limit switch 195. During the initial movement of the drill-head 15 the shaft 36 rotates at a speed proportional to that of the lead-screw, so as to drive the shaft 55 at slow speed and rotate the disc 59 through the one-way coupling 66, 68. The disc 59 which initially was in the position shown in Figure 5 turns until the slot 118 uncovers the window 111 of the fast forward photo-electric cell 90. At this stage the switch F, Figure 10, is closed and the circuit of the coil $C^1$ is then maintained through the switches $D^2$, $G^2$ and $E^2$. The push button S may now be released and the button U be pressed so as to complete the circuit of the coils $A^1$ and $B^1$ through the stop button V and overload switches X, Y and Z. The switches A and B are thus energized and bring the motors 23 and 24 into operation at the same time maintaining the circuits to the coils $A^1$ and $B^1$ through the switch $A^2$ and upper limit switch 195. The drill-spindle is now rotating and the drill-head 15 is being fed downwardly at fast speed.

The drill-head 15 continues to move downwardly at fast speed until the slot 118 in the disc 59 has passed the window 111 of the cell 90 whereupon the switch F is opened and the fast-speed motor 23 becomes de-energized through de-energization of the coil $C^1$. The brake 179, 181 of the motor 23 is automatically applied to hold the motor spindle at rest. This stoppage of the motor 23 under the control of the disc 59 is arranged to occur just before the point of the drill 231 touches the work, that is to say when the drill has performed the travel represented by $a$ in Figure 9, and at this stage the drill-head continues to move downwardly at slow speed, being driven by the motor 24 through the differential mechanism 169, 170, 172, the bevel gear 178 being held against rotation by the brake of the motor 25. The feed of the drill-head continues and the disc 59 continues to turn until the first reverse slot 120 reaches the window 114 of the reverse photo-electric cell 91. At this point the drill has performed a cutting stroke through the distance $b$ and the energization of the reverse cell 91 closes the switch R, Figure 10, so as to energize the relay coil K. The switch $K^1$ is thereby closed and the switch $K^2$ opened. The contactor coil $D^1$ is energized through the switch $K^1$, switches $C^2$ and $J^2$, interlocking contacts $S^2$ of the button S, limit switch 195, stop button V and switches X, Y and Z. The reverse contactor D is closed, thus starting the motor 25 in reverse. The drive from the motor 25 overruns the drive from the slow feed motor 24 and is transmitted through the differential gearing 178, 170, 172 to the shaft 29, thus causing the lead-screw 16 to be operated in reverse at fast speed and to raise the drill-head 15 quickly. The shaft 36 is also driven in reverse and transmits a reverse drive to the shaft 55, Figure 3, whereupon the plunger 66 is moved clockwise as viewed in Figure 4 and commences to ride out of the recess 68, the disc 59 remaining stationary, being held against movement by the brake 69, 70, 71. Up to this point the quadrant 60 has remained stationary in the position shown in Figure 4, being held in this position by engagement between the stop member 87 and the post 79. As soon as the shaft 55 is driven in reverse the quadrant 60 is moved with it in a clockwise direction, as viewed in Figure 4, being driven through the slipping clutch 85, 86. Almost immediately the stepped portion 122 of the slot 121 in the quadrant moves past the window 112 of the fast forward cell 90 and exposes the cell to light. This causes switch F, Figure 10, to be closed, but the circuit of the coil $C^1$ is not completed because the switch $D^2$ has previously been opened by energization of the coil $D^1$.

The opening of the switch $K^2$ mentioned above opens the continuous current circuit through the rectifier M, coil H, resistance O and switch $G^4$, but the coil H remains energized for a predetermined time interval due to a discharge from the condenser P through the resistance O. During this time interval the reverse movement of the drill-head continues and the drill is withdrawn from the work through the distance represented by $c$ in Figure 9. During this interval the quadrant continues to move clockwise as viewed in Figure 4 or counterclockwise as viewed in Figure 5 and the slot 121 in the quadrant is of sufficient length to maintain both of the cells 90 and 91 energized. As soon as the condenser P has become discharged the coil H is de-energized and the switch $H^1$ is closed, thereby energizing the relay coil J and opening the switches $J^1$ and $J^2$. As soon as the switch $J^2$ is opened the coil $D^1$ is de-energized, thus de-energizing the fast-speed motor 25, and at the same time switch $D^2$ is closed, thus energizing the contactor coil $C^1$, energizing the contactor C and immediately the motor 25 is started in the forward direction. The drill-head 15 is now advanced to bring the point of the drill close to the last cutting point on the work and during this advance movement the plunger 66 is moved counterclockwise as viewed in Figure 4 into the recess 68 so that ultimately the drive of the disc 59 is picked up at the point where it last ended. The quadrant 60 is also moved back until its stop member 87 again engages the post 79, whereupon the clutch 85, 86 commences to slip again and the quadrant remains stationary. Just before this occurs the stepped portion 122 of the slot 121 in the quadrant covers the window 112 (Figure 5) of the forward cell 90, thus de-energizing the cell and opening the contact F, so that the drill-head 15 continues to be driven only by the slow-feed motor 24. The slow feed of the drill is then continued to bring the point of the drill up to the last point of cutting in the work and to travel the drill through the distance represented at $d$ in Figure 9.

During the return movement of the quadrant 60 while the drill 231 is moving downwardly through the distance represented by $c$ in Figure 9 the reverse cell 91 remains energized and the switch R is therefore closed. Due to the energization of the coil K the switch $K^2$ remains open, with the coil H de-energized and the coil J energized so that the switch $J^2$ remains open and the reverse contactor coil $D^1$ de-energized. Energization of the coil $D^1$ cannot then take place until the coil H has been energized by closure of the switch $K^2$, or in other words until the coil K has become de-energized by de-energization of the cell 91.

It will be seen from Figure 5 that additional reverse slots 120 in the disc 59 are arranged to come into operation at predetermined intervals, so as to bring about fast reverse and return movements of the drill 231 corresponding to the indications $e$ and $g$ in Figure 9, such reverse and return movements being interposed between slow (cutting) feeds of the drill represented at $d$, $f$ and $h$ in Figure 9. When these cutting feeds have been completed the drill has penetrated through the journal 221 and at this point the first of the slots 119 in the disc 59 uncovers the window 111 of the fast cell 90 thus energizing the cell and closing the switch F. The contactor coil $C^1$ is then energized for a period corresponding to that taken by the slot 119 to pass the window 111 and fast forward movement of the drill is performed to carry the cutting end thereof across the gap between the crank arms 225 and 226. The fast speed motor 25 is then de-energized and slow cutting, fast reverse and return, and fast forward movements are continued in the required sequence under the control of the slots 119 and 120 of the disc 59, such control being modified during the reverse and return movements by the slot 121 and stepped portion 122 thereof in the quadrant 60. When the drill has passed through all of the journals of the crank-shaft the last of the reverse slots 120 is arranged to uncover the window 114 of the reverse cell 91 and at the same time the limit switch 196 at the bottom of the pillar 13 is closed thus energizing the coil E through the switch R which is closed by the reverse cell. The relay coil E has its circuit maintained through the switch E¹ and upper limit switch 195 and it closes the switch E³ so as to energize the reverse contactor coil D¹ and close the reverse contactor D. The motor 25 is operated in reverse and continues to raise the drill-head 15 until the upper limit switch 195 is opened so as to de-energize the coil E¹ and open the switch E³. The drill-head is thus returned to its initial position ready to commence a fresh succession of drilling operations, reverse movement of the quadrant 60 being limited by engagement of one arm 82 with the post 79.

In the event of an overload due to the drill encountering excessive resistance, or due to the abutment 219 on the drill-head engaging the stop screw 220, the worm overload release switch is operated as previously described thus closing the switches W¹ and W², Figure 10. The switch W² ensures that the coil H remains energized until the mechanical overload has been relieved and the switch W¹ energizes the coil G which is self-maintaining through the switch G¹ and switch J¹, and the energization of the coil G opens the switch G⁴. As soon as the switch W² has opened the timing device constituted by the condenser P, resistance O and coil H comes into operation and the coil H is de-energized after a predetermined time interval. Energization of the reverse contactor coil D¹ having previously occurred through closure of the switch G³ by the coil G a timed reversal of the feed of the drill-head is carried out in the manner as described previously. If swarf is impeding the progress of the drill, timed reversals will be automatically repeated if necessary until the swarf has been cleared.

The push button control of the motors 23, 24 and 25 is arranged to override the automatic control by the photo-electric cells so that whenever desired the operator may start the fast speed motor 25 in forward or reverse or stop all motors. The push button T is employed for starting the motor 25 in reverse and it will be noted that by depressing this button the reverse contactor coil D¹ is energized through contacts T¹, interlocking contacts S² of the button S and the limit switch 195. A drilling template 232 is shown in Figure 9 and if it is desired to remove this template after commencing to drill the first journal 221, the stop button V may be depressed as soon as the drill has reached the end of its first reverse movement, whereupon with all the motors stopped, the removal can be effected. The motors can then be re-started by a re-start button or the push button V so that the further drilling operations are performed under the control of the photo-electric cells. Similarly manual stoppage and re-starting of the machine can be effected when desired to permit removal of intermediate drilling templates carried by the bars 26 in Figure 1 and to permit transference of such templates to lower spaces between journals of the crank-shaft.

The whole of the foregoing succession of operations is performed automatically under the control of the disc 59 and quadrant 60 during one complete rotation of the disc. Thus when one complete succession of operations has been performed the disc and quadrant are in position ready to commence a repetition of the same succession of operations on a fresh crankshaft. When it is desired to drill a crankshaft having journals differing in length, relative disposition, or overall dimensions from those previously machined, all that is necessary is to substitute for the existing disc 59 another disc formed with slots corresponding to the different succession of operations then required. The substitution may be effected by releasing the bolts 101, Figure 5, rocking the lamp casing 99 on its pivot 100 away from the disc and quadrant, and releasing the bolts 62. The disc 59 with its plate 61 can then be removed and the fresh disc and plate mounted in position and secured by the bolts 62, whereupon the lamp casing 99 is returned to its operative position and secured in place by the bolts 101. The fresh disc can be set accurately in position, ready for the commencement of the required succession of operations, by manipulation of the adjusting knob 128 so as to bring a marking on the disc into line with the marking 138 on the indicator plate 137. The simplicity of this resetting procedure is in very marked contrast to the complicated alterations required for resetting a mechanically operated automatic machine controlled by a multiplicity of cams, lever-trip devices and similar mechanical parts all of which would require to be adjusted or substituted by modified parts for resetting purposes.

It will be appreciated that the length and arrangement of the slots formed in the disc 59 may be varied considerably according to the variations that may be required to be made in the succession of operations to be performed. For certain purposes, for instance for reaming, the control of the operations may be secured by means of the disc 59 alone, that is to say without the quadrant 60. The same disc 59 can be employed for controlling the succession of movements required when reaming a crankshaft which has just been drilled, and as in this case no reverse and return movements would be needed, the reverse photo-electric cell may be kept out of operation. If any of the fast forward slots in the disc 59 are not required when reaming they may be covered by a suitable mask.

It will be appreciated that the system of control described in the foregoing embodiment simplifies the drilling of articles, such as crankshafts, requiring a succession of movements of the drill-head. The time required for machining the work can be considerably reduced, with a consequent increase in production, and less attention is required on the part of the operative, thus making possible a saving in production costs. To facilitate further the production of the finished work it is convenient to employ two machines side by side as shown in Figure 1, and to use one for drilling operations and the other for the subsequent reaming operations.

It is to be understood that the system of control in accordance with the invention is applicable not only to drilling machines but also to other machine tools, and in fact to any machine or apparatus wherein a predetermined succession of operations is to be performed. Moreover the present form of control is not only applicable to controlling the movements of a single movable member in a plurality of different directions at different stages of its operation, but it is also equally suitable for co-relating the movements of a plurality of different parts. The simple control elements constituted by the disc 59 and quadrant 60 have been shown as controlling two photo-electric cells, but obviously they could be employed for controlling three or more cells if desired, according to the nature of the succession of operations to be carried out in the machine or apparatus.

It is to be understood that the invention is not restricted to the precise constructional details shown in the drawings. For instance instead of the shutters of the photo-electric cells being constituted by the disc 59 and the quadrant 69 they might take the form of rotatable cylindrical members, reciprocable slides, endless bands or the like.

I claim:

1. In apparatus of the class described wherein a predetermined succession of operations is required to be performed, the combination comprising a movable operating member for performing said succession of operations, an electrically operated device governing the operation of said member, a plurality of photo-electric cells, means for directing light to said cells, a shutter common to said cells and interposed between them and said light-directing means, which shutter includes light-transmitting and light-excluding portions for alternately energizing and de-energizing said cells, means for driving the shutter to move in proportion to movements of said movable member, and means for controlling said electrically-operated device in accordance with the energization and de-energization of the photo-electric cells.

2. In apparatus of the class described wherein a predetermined succession of operations is required to be performed, the combination comprising a movable member which is to have a variable feed-movement and an additional change of movement superimposed at a predetermined stage on its variable feed-movement, an electrically-operated device for governing the movements of said movable member, a photo-electric cell, means for directing light to said cell, a shutter interposed between said light-directing means and the photo-electric cell and including light-transmitting and light-excluding portions, means for causing relative movement between said shutter and photo-electric cell to vary the energization of the latter in a predetermined manner, an auxiliary shutter interposed between said light-directing means and the photo-electric cell, means for operating the auxiliary shutter during the said additional change in the movement of the movable member in such manner as to modify the energization of the photo-electric cell, and means for controlling said electrically-operated device in accordance with the energization and de-energization of the photo-electric cell.

3. In apparatus of the class described wherein a predetermined succession of operations is required to be performed, the combination comprising a movable member which is to have a variable feed-movement having superimposed thereon at a predetermined stage, an additional change of movement consisting in a reverse movement followed by a return of the member approximately to the position occupied by it immediately before the reversal, an electrically-operated device governing the movements of said member, a photo-electric cell, means for directing light to said cell, a shutter interposed between said light-directing means and the photo-electric cell and including light-transmitting and light-excluding portions of predetermined dimensions, means for driving the shutter to move in proportion to the feed-movement of the movable member, an auxiliary shutter interposed between said light-directing means and the photo-electric cell and including light-transmitting and light-excluding portions, means for oscillating said auxiliary shutter during the reverse and return movements of the movable member with movements proportional to said reverse and return movements, and means for controlling said electrically-operated device in accordance with the energization and de-energization of the photo-electric cell.

4. In apparatus of the class described wherein a predetermined succession of operations is required to be performed, the combination comprising a movable member which is to have a variable feed-movement having superimposed thereon, at a predetermined stage, an additional change of movement, an electrically-operated device for varying the movements of said movable member, a photo-electric cell, a casing enclosing said cell and having windows formed therein, means for directing light to said cell through said windows, a shutter interposed between said light-directing means and one of said windows and including light-transmitting and light-excluding portions, means for driving the shutter to move said portions past the appropriate window so as to control the variable feed-movement of the movable member, an auxiliary shutter interposed between another window and said light-directing means and having light-transmitting and light-excluding portions, means for operating the auxiliary shutter to control the additional change in the movement of the movable member, and means for actuating said electrically-operated device in accordance with the energization and de-energization of the photo-electric cell.

5. In apparatus of the class described wherein a predetermined succession of operations is required to be performed, the combination comprising a movable member which is to have a variable feed-movement having superimposed thereon at a predetermined stage an additional change of movement, an electrically-operated device for varying the movements of said movable member, a photo-electric cell, means for directing light to said cell, a disc, means for rotatably mounting said disc in a position interposed between said light-directing means and the photo-electric cell, said disc being formed with openings to expose said cell in a predetermined manner, means for rotating the disc, a quadrant, means for mounting the quadrant to oscillate about the axis of said disc between said light-directing means and the photo-electric cell, means for oscillating the quadrant to control said additional change in the movement of the movable member by controlling the energization of said cell, and means for actuating said electrically-operated device in accordance with the energization and de-energization of the photo-electric cell.

6. In a machine tool having a tool carrier, a work support, and means for causing relative movement between the tool carrier and work support, said means comprising an electric motor which operates continuously, a drive shaft, a reversible electric motor, differential mechanism coupling said continuous and reversible motors to said drive shaft to permit the latter to be driven at fast speed by said reversible motor and at slow speed by said other motor, a pair of photo-electric cell mechanisms for controlling said reversible motor to operate it alternately in opposite directions, and shutter means actuated by the relative movement of the tool carrier and work support cooperating with alternate photo-electric cell mechanism at the alternate limits of relative movement.

7. In apparatus of the class described wherein a predetermined succession of operations is required to be performed, the combination comprising a movable operating member for performing said succession of operations, an electrically-operated device governing the operation of said member, a photo-electric cell, means for directing light to said cell, a shutter interposed between the cell and said light-directing means, which shutter includes light-transmitting and light-excluding portions for alternately energizing and de-energizing said cell, means for driving the shutter to move in proportion to movements of said movable member, and means for controlling said electrically-operated device in accordance with the energization and de-energization of the photo-electric cell.

8. In apparatus of the class described wherein a predetermined succession of operations is required to be performed, the combination comprising a movable member which is to have a variable feed-movement having superimposed thereon at a predetermined stage a reverse movement followed by a return of the member approximately to the position occupied by it immediately before the reversal, a photo-electric cell, an electrically-operated device including said photo-electric cell whereby the movements of the movable member are varied, movable main and auxiliary electric-circuit control-elements, means for moving the main control-element in proportion to the feed movement of the movable member, means for varying the energization of said electrically-operated device under the control of said main control-element to control variations in the feed-movement of the movable member, means for energizing said electrically-operated device from said main control-element for reverse movement of the movable member, means for oscillating the auxiliary control-element during said reverse and return movements of the movable member with movements proportional to said reverse and return movements, and means operated by said auxiliary control-elements for modifying the control secured by said main control-element.

ERNEST JAMES HENRY JONES.